United States Patent
Julian

(10) Patent No.: US 8,783,536 B1
(45) Date of Patent: Jul. 22, 2014

(54) UNIVERSAL BICYCLE RACK WITH LIFTING MECHANISM

(76) Inventor: Ralph R. Julian, Bay City, MI (US)

(*) Notice: Subject to any disclaimer, the term of this patent is extended or adjusted under 35 U.S.C. 154(b) by 274 days.

(21) Appl. No.: 13/349,662

(22) Filed: Jan. 13, 2012

(51) Int. Cl.
| B60R 11/00 | (2006.01) |
| B60R 9/06 | (2006.01) |
| B60R 5/04 | (2006.01) |
| B60R 9/045 | (2006.01) |

(52) U.S. Cl.
CPC . *B60R 11/00* (2013.01); *B60R 9/06* (2013.01); *B60R 5/04* (2013.01); *B60R 9/045* (2013.01)
USPC .......................................... 224/495

(58) Field of Classification Search
CPC ............ B60R 11/00; B60R 9/06; B60R 5/04; B60R 9/045
USPC .......................................... 224/495; 414/462
See application file for complete search history.

(56) References Cited

U.S. PATENT DOCUMENTS

| 595,967 | A | | 12/1897 | Parsons | |
| 3,601,269 | A | * | 8/1971 | Heinig | 414/546 |
| 4,775,282 | A | * | 10/1988 | Van Vliet | 414/462 |
| 4,941,797 | A | * | 7/1990 | Smillie, III | 414/462 |
| 4,997,116 | A | | 3/1991 | Grim | |
| 5,431,522 | A | * | 7/1995 | Ross | 414/462 |
| 5,567,107 | A | * | 10/1996 | Bruno et al. | 414/462 |
| 5,655,696 | A | | 8/1997 | Simonett | |
| 5,984,613 | A | * | 11/1999 | Motilewa | 414/462 |
| 6,422,443 | B1 | | 7/2002 | Erickson et al. | |
| 6,595,398 | B2 | | 7/2003 | Himel, Jr. | |
| 6,698,995 | B1 | * | 3/2004 | Bik et al. | 414/462 |
| 6,857,839 | B2 | * | 2/2005 | Pitoniak | 414/462 |
| 2002/0005423 | A1 | * | 1/2002 | Grover | 224/509 |
| 2003/0099531 | A1 | * | 5/2003 | Williams | 414/462 |
| 2006/0037986 | A1 | | 2/2006 | Wang | |
| 2008/0025828 | A1 | * | 1/2008 | Strasssman et al. | 414/462 |
| 2008/0121672 | A1 | | 5/2008 | Ripaldi et al. | |
| 2008/0206030 | A1 | * | 8/2008 | Reuille et al. | 414/462 |
| 2009/0152314 | A1 | * | 6/2009 | Myrex | 224/502 |

* cited by examiner

*Primary Examiner* — Brian D Nash
(74) *Attorney, Agent, or Firm* — Montgomery Patent & Design; Robert C. Montgomery

(57) ABSTRACT

A universal bicycle rack with a lifting mechanism comprises a vehicle hitch-mounted bicycle carrier with mechanical vertical adjustment capabilities, a bicycle rack and a crank assembly. The bicycle rack comprises a durable metal bicycle receiving and retaining structure which provides securement of a plurality of bicycles to a motor vehicle for transport. The rack is connected to a crank assembly, comprising a hitch receiver, a vertical adjustment assembly, and a crank handle. The crank assembly is attached to an existing vehicle hitch via the hitch receiver portion. The vertical adjustment assembly provides attachment to the bicycle rack. The height of the attachment portion is manually adjustable via the crank handle. In use, a user may lower the rack, roll a bicycle into position over the rack, and utilize the crank handle to raise the rack and bicycles off of the ground surface for subsequent transport.

12 Claims, 2 Drawing Sheets

UNIVERSAL BICYCLE RACK WITH LIFTING MECHANISM

RELATED APPLICATIONS

There are currently no applications co-pending with the present application.

FIELD OF THE INVENTION

The present invention relates generally to bicycle racks, and in particular, to bicycle racks which can be adjusted.

BACKGROUND OF THE INVENTION

Bicycle riding is a popular sport which is preformed by many people. Often bicycles are towed to a particular riding location via a vehicle and a rack mounted to a hitch upon the vehicle. Various racks are known for transporting bicycles. A common problem with all these devices is the limited adjustability. Another problem is mounting upon a vehicle. Furthermore with all these devices, the mounting and removing of bicycles is difficult.

Various attempts have been made to provide a bicycle rack. Examples of these attempts can be seen by reference to several U.S. patents. U.S. Pat. No. 4,997,116, issued in the name of Grim, describes a carrier rack which is suspended from a vehicle.

U.S. Pat. No. 5,655,696, issued in the name of Simonett, describes an adjustable bicycle rack.

U.S. Pat. No. 6,422,443, issued in the name of Erickson et al., describes a bicycle rack which is suspended upon a rear portion of the vehicle.

While these devices fulfill their respective, particular objectives, each of these references suffer from one (1) or more disadvantages. Many are not suited for adjustability or the easily mounting to a vehicle. Others are not suited for removing or mounting a bicycle easily onto the rack.

SUMMARY OF THE INVENTION

The inventor has recognized the aforementioned inherent problems and lack in the art and observed that there is a need for a bicycle rack which is adjustable, easily mounted to a vehicle, and enables for uncomplicated removing and mounting of bicycles onto the rack.

Accordingly, it is an object of the present embodiments of the invention to solve at least one of these problems. The inventor has addressed this need by developing a bicycle rack with a lifting mechanism.

To achieve the above objectives, it is an object of the present invention to provide an adjustable hitch-mounted bicycle carrier.

Another object of the present invention is to provide the bicycle carrier with a lower connecting arm which receives a receiving hitch on an existing motor vehicle.

Yet still another object of the present invention is to attach the lower connecting arm to a lower base section.

Yet still another object of the present invention is to provide an upper base section.

Yet still another object of the present invention is to provide an adjusting gear mechanism attached to said lower base section and engaged with said upper base section.

Yet still another object of the present invention is to provide a hand crank which engages with the adjusting gear mechanism.

Yet still another object of the present invention is to provide the bicycle carrier with a plurality of holding arms.

Yet still another object of the present invention is to provide a method of utilizing the device that provides a unique means of connecting a lower connecting arm to an existing receiving hitch on an existing motor vehicle, attaching a lower base section to said lower connecting arm, attaching an adjusting gear mechanism to said lower base section, engaging said adjusting gear mechanism with said upper base section, and removably engaging the hand crank with the adjusting gear mechanism.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings in which like elements are identified with like symbols and in which:

| DESCRIPTIVE KEY | |
|---|---|
| 10 | adjustable height receiver hitch-mounted bicycle carrier |
| 15 | motor vehicle |
| 20 | lower connecting arm |
| 25 | receiving hitch |
| 30 | hitch restraining pin |
| 35 | lower base section |
| 40 | angle brace |
| 45 | upper base section |
| 50 | adjusting gear mechanism |
| 55 | horizontal section |
| 60 | holding arms |
| 65 | connecting mechanisms |
| 70 | bicycle |
| 75 | pavement or ground level |
| 80 | hexagonal adjusting nut |
| 85 | first rotational arrow |
| 90 | second rotational arrow |
| 95 | removable hand crank |
| 100 | crank shaft |
| 105 | welded connection |
| 110 | first conical meshing gear |
| 115 | second conical meshing gear |
| 120 | bearing plate |
| 125 | bearing |
| 130 | central vertical shaft |

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment, and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

Figure 1:
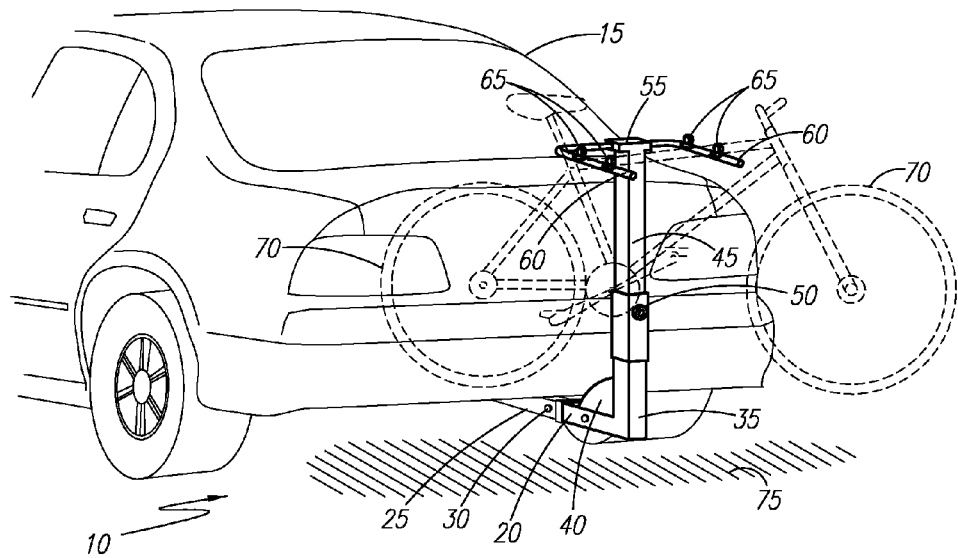
FIG. 1 is an isometric view of the adjustable height receiver hitch-mounted bicycle carrier 10, in a lowered state, according to the preferred embodiment of the present invention.

Referring now to FIG. 1, an isometric view of the adjustable height receiver hitch-mounted bicycle carrier 10 (herein described as the "carrier"), in a lowered state, according to the preferred embodiment of the present invention, is disclosed. The carrier 10 is provided on the rear of a motor vehicle 15. For purposes of illustration, the motor vehicle 15 is depicted as an automobile, however, it should be noted that other motor vehicles, such as trucks, vans, and the like could be utilized with equal effectiveness. A lower connecting arm 20 connects into a receiving hitch 25 on the motor vehicle 15 in the customary manner. The lower connecting arm 20 is physically secured to the receiving hitch 25 by use of a hitch restraining pin 30. A lower base section 35 is held in place by an angle brace 40 in a manner that positions the lower base section 35 in a vertical position. An upper base section 45 is positioned above the lower base section 35 and is physically connected with the use of an adjusting gear mechanism 50. The functionality and usage of the adjusting gear mechanism 50 will be described in greater detail herein below. Located at the top of the upper base section 45 is a horizontal section 55 used to provide stability to the carrier 10 and any objects placed upon it. Finally, a set of two (2) holding arms 60 project outwardly as shown in a conventional manner. The holding arms 60 would be provided with a series of connecting mechanisms 65 used to hold at least one (1) bicycle 70 securely in place such that they will not become dislodged during travel.

The exact configuration of the connecting mechanisms 65 is not within the scope of this disclosure and is envisioned to be clamps, levers, straps, or another device that is typically used upon conventional bicycle carriers. Other objects such as tricycles, mopeds, electric bicycles, wheelchairs, and the like could be used upon the carrier 10 as well with equal effectiveness, thus not limiting the effectiveness of the carrier 10 to bicycles alone. It is envisioned that the holding arms 60 would be capable of holding two (2) to four (4) bicycles depending on exact configuration. The distance of the receiving hitch 25 above the pavement or ground level 75 is controlled by the motor vehicle 15 and is envisioned to be approximately twelve (12) inches. The distance of the receiving hitch 25 to the horizontal section 55 in this lowered state is envisioned to be approximately twenty-six (26) inches. Said distances place the horizontal section 55 approximately thirty-eight (38) inches above the ground or grade which allows the crossbar of the bicycles 70 to be simply placed or slid over the holding arms 60 without the necessity of lifting them on or off of the holding arms 60 as is typically the case with conventional bicycle carriers. This feature is viewed as especially beneficial to users who may be very young, very old, or physically incapable of lifting heavy objects, but still the desire to exercise by bicycle riding.

Figure 2:
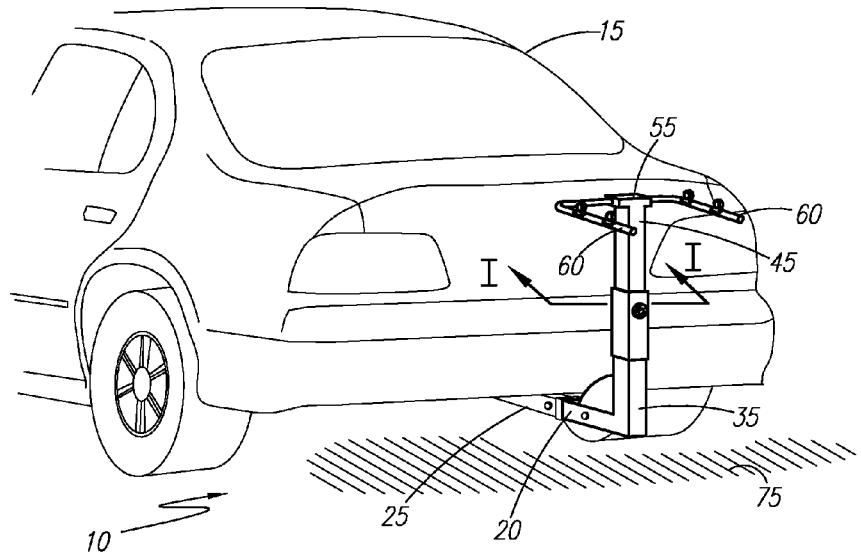
FIG. 2 is an isometric view of the adjustable height receiver hitch-mounted bicycle carrier 10, in a raised state, according to the preferred embodiment of the present invention.

Referring next to FIG. 2, an isometric view of the carrier 10, in a raised state, according to the preferred embodiment of the present invention is depicted. This figure more clearly depicts the carrier 10 in a position that would be utilized during transport. The distance of the receiving hitch 25 above the pavement or ground level 75 is controlled by the motor vehicle 15 and is envisioned to be approximately twelve (12) inches as aforementioned described. The distance of the receiving hitch 25 to the horizontal section 55 in this lowered state is envisioned to be approximately thirty-eight (38) inches. Said distances place the horizontal section 55 approximately fifty (50) inches above the ground or grade which allows for adequate clearance of all components of the bicycles 70 while the motor vehicle 15 is in motion. Such elevated placement of the horizontal section 55 and the holding arms 60 is similar in location to that of a conventional bicycle rack that is fixed in place. It should be noted that users who possess adequate strength may lift any bicycles 70 directly on and off of the holding arms 60 as would be normally performed. It is envisioned that major components of the carrier 10 such as the lower connecting arm 20, the lower base section 35, the upper base section 45, and the horizontal section 55 would be constructed of square steel tubing. Such tubing not only possesses great physical strength, but the square configuration also prevents inadvertent rotation of the various components along the axial moment. If cylindrical tubing should be utilized, other methods of preventing rotation such as detent connecting pins could be utilized.

Figure 3:
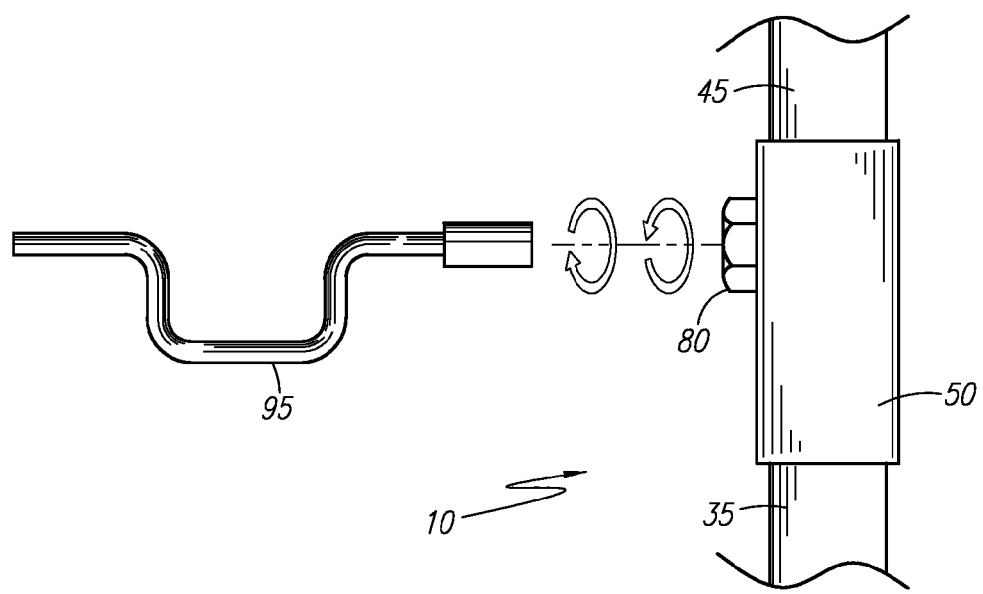
FIG. 3 is a front view of the adjusting gear mechanism 50, as used with the adjustable height receiver hitch-mounted bicycle carrier 10, according to the preferred embodiment of the present invention; and, FIG. 4 is a sectional view of the adjustable height receiver hitch-mounted bicycle carrier 10, as seen along a line I-I, as shown in FIG. 2, according to the preferred embodiment of the present invention.

Referring now to FIG. 3, a front view of the adjusting gear mechanism 50, as used with the carrier 10, according to the preferred embodiment of the present invention is shown. This figure more clearly depicts the adjusting gear mechanism 50 along with a hexagonal adjusting nut 80 used to perform the actual adjustment. The hexagonal adjusting nut 80 would be turned in a first direction such as clockwise to lower the upper base section 45 in relation to the lower base section 35 and is depicted by a first rotational arrow 85. Likewise, the hexagonal adjusting nut 80 would be turned in the opposite direction such as counterclockwise to raise the upper base section 45 in relation to the lower base section 35 and is depicted by a second directional arrow 90. In its base configuration, a removable hand crank 95 is provided to assist the user in said raising and lowering process. Alternate versions or models of the carrier 10 could utilize an adapter socket which connects to a standard cordless drill that assists in the raising and lowering operation. Finally, yet another alternate version would provided for an internal DC motor and gearbox which connects to the cigarette lighter of the motor vehicle 15 (as shown in FIGS. 1 and 2) and is controlled by a simple UP-OFF-DOWN switch which subsequently raises and lowers the upper base section 45 in relation to the lower base section 35. Such alternate configurations are well known to those skilled in the art and outside of the scope of the present invention.

Figure 4:
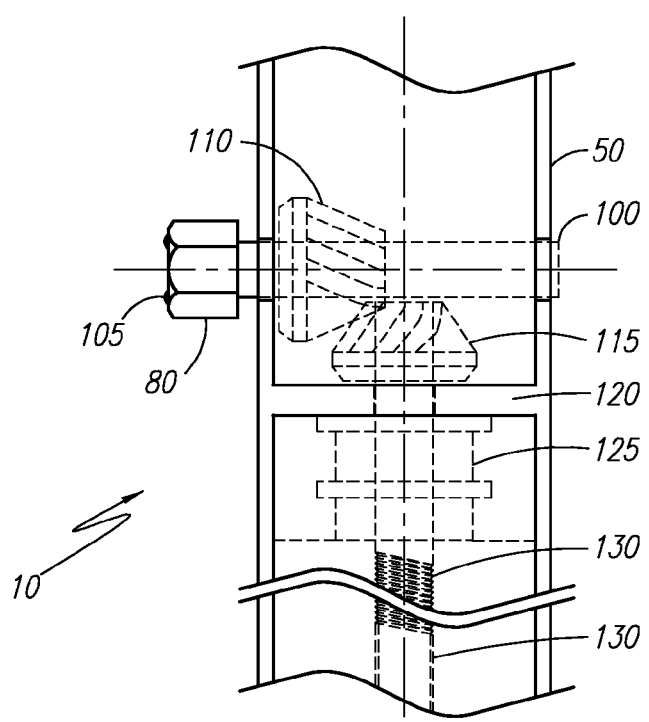

Referring finally to FIG. 4, a sectional view of the carrier 10, as seen along a line I-I, as shown in FIG. 2, according to the preferred embodiment of the present invention is shown. This figure clearly shoes the hexagonal adjusting nut 80 connected to a welded connection 105 via a first conical meshing gear 110. The crank shaft 100 also supports a first conical meshing gear 110 in a horizontal configuration. The first conical meshing gear 110 mates with a second conical meshing gear 115 in a vertical configuration. The second conical meshing gear 115 is supported by a bearing plate 120 and thus maintains a fixed position in relation to the adjusting gear mechanism 50. The second conical meshing gear 115 is retained by a bearing 125 and is connected firmly to a central vertical shaft 130. Thus, it can be seen that as the central vertical shaft 130 turns, the adjusting gear mechanism 50 will move up and down in a corresponding manner. Such operation is similar to that seen on a screw style scissors jack used on a motor vehicle. Due to the pitch of first conical meshing gear 110 working against the second conical meshing gear 115 and the bearing plate 120, inadvertent operation of the adjusting gear mechanism 50 in either an up or down direction would be impossible and thus adds inherent safety to the carrier 10.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. It is envisioned that the carrier 10 would be constructed in general accordance with FIG. 1 through FIG. 4. After procurement of the carrier 10 and initial one-time assembly of various components, the invention would be ready for utilization by the final consumer. To being utilization, the user would install the carrier 10 upon the motor vehicle 15 by sliding the lower connecting arm 20 within the receiving hitch 25 until it is properly positioned. Next, the carrier 10 would be secured in place by installing the hitch restraining pin 30 within the lower connecting arm 20 and receiving hitch 25 concurrently. At this point in time, the unique adjustable aspects of the carrier 10 would be ready for utilization.

Next, the user would lower the horizontal section 55 and the holding arms 60 to its lowest position, by using the removable hand crank 95 upon the hexagonal adjusting nut 80 or by utilizing any of the electrical assist means as aforementioned described. At this point in time, the user can roll any and all bicycles 70 directly onto the outstretched holding arms 60 and secure the bicycles 70 in place by use of the connecting mechanisms 65 in a conventional manner. Next, the user would again access the hexagonal adjusting nut 80 and operate it in an opposite direction to subsequently raise the upper base section 45 as well as the horizontal section 55 and the holding arms 60 and also the bicycles 70 into a raised position as shown in FIG. 2 for transport. Transport of the bicycles 70 would then occur by operating the motor vehicle 15 and driving it in a conventional and unimpeded manner to its destination.

At this point in time, the bicycles 70 may be removed from the carrier 10 by reversing the procedure as aforementioned described. The carrier 10 may then be removed from the motor vehicle 15 or left in place should immediate re-use be anticipated.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. An adjustable hitch-mounted bicycle carrier for use with a vehicle, said hitch-mounted bicycle carrier comprising:
   a lower connecting arm;
   a lower base section attached to said lower connecting arm;
   an upper base section;
   an adjusting gear mechanism attached to said lower base section and engaged with said upper base section, comprising:
      an adjusting nut rotatable between clockwise and counter clockwise directions to lower and raise said upper base section in relation to said lower base section;
      a first conical meshing gear disposed at a horizontal configuration relative to a longitudinal length of said lower and upper base sections respectively;
      a second conical meshing gear;
      a bearing firmly connected to a central vertical shaft; and,
      a bearing plate attached to said second conical meshing gear;
   a hand crank engaged with said adjusting gear mechanism such that rotational movement of said hand crank causes rotational movement of said adjusting gear mechanism and thereby linearly reciprocates said upper base section relative to said lower base section.

2. The hitch-mounted bicycle carrier of claim 1, further comprising: a plurality of holding arms attached to said upper base section.

3. The hitch-mounted bicycle carrier of claim 1, wherein said upper base section has a horizontal section adapted to provide stability to a bicycle placed thereon.

4. The hitch-mounted bicycle carrier of claim 1, wherein said first conical meshing gear is welded to said adjusting nut via a welded connection.

5. The hitch-mounted bicycle carrier of claim 1, wherein said first conical meshing gear mates with said second conical meshing gear in a vertical configuration.

6. The hitch-mounted bicycle carrier of claim 1, wherein said second conical meshing gear is supported by said bearing plate and thus maintains a fixed position in relation to said adjusting gear mechanism.

7. An adjustable hitch-mounted bicycle carrier for use with a vehicle, said hitch-mounted bicycle carrier comprising:
   a lower connecting arm adapted to be connected to an existing receiving hitch on an existing motor vehicle;
   a lower base section attached to said lower connecting arm;
   an upper base section;
   an adjusting gear mechanism attached to said lower base section and engaged with said upper base section, comprising:
      an adjusting nut rotatable between clockwise and counter clockwise directions to lower and raise said upper base section in relation to said lower base section;
      a first conical meshing gear disposed at a horizontal configuration relative to a longitudinal length of said lower and upper base sections respectively;
      a second conical meshing gear;
      a bearing firmly connected to a central vertical shaft; and,
      a bearing plate attached to said second conical meshing gear;
   a hand crank removably engaged with said adjusting gear mechanism such that rotational movement of said hand crank causes rotational movement of said adjusting gear mechanism and thereby linearly reciprocates said upper base section relative to said lower base section.

8. The hitch-mounted bicycle carrier of claim 7, further comprising: a plurality of holding arms attached to said upper base section.

9. The hitch-mounted bicycle carrier of claim 7, wherein said upper base section has a horizontal section adapted to provide stability to a bicycle placed thereon.

10. The hitch-mounted bicycle carrier of claim 7, wherein said first conical meshing gear is welded to said adjusting nut via a welded connection.

11. The hitch-mounted bicycle carrier of claim 7, wherein said first conical meshing gear mates with said second conical meshing gear in a vertical configuration.

12. The hitch-mounted bicycle carrier of claim 7, wherein said second conical meshing gear is supported by said bearing plate and thus maintains a fixed position in relation to said adjusting gear mechanism.

\* \* \* \* \*